Patented Mar. 28, 1944

2,345,134

UNITED STATES PATENT OFFICE

2,345,134

SODIUM ALUMINATE PRODUCT AND PROCESS OF PRODUCING THE SAME

Frederick K. Lindsay, La Grange, and Benjamin F. Willey, Chicago, Ill., assignors to National Aluminate Corporation, Chicago, Ill., a corporation of Delaware No Drawing. Application November 27, 1939, Serial No. 306,292

12 Claims. (Cl. 23—52)

The present invention relates to a new and improved composition of matter consisting substantially of a very soluble form of sodium aluminate which is further characterized by the fact that solutions prepared therefrom will remain stable over long periods of time.

One of the principal objects of the present invention is a particularly desirable dry form of sodium aluminate containing up to 5% of a stabilizing ingredient so thoroughly dispersed therethrough that it will pass into solution substantially simultaneously with the sodium aluminate when the composition of the present invention is dissolved in water, with the result that the solution thus obtained will not become cloudy or precipitate aluminum hydroxide even upon long standing. The composition is also characterized by the fact that the sodium aluminate therein has an extraordinarily low ratio of sodium oxide to alumina, namely, on the order of $Na_2O:Al_2O_3::1.11:1$.

The invention also concerns a method of manufacturing the above product in which particular care is taken to prevent decomposition of the material by excessive temperatures during the manufacturing operations.

The present invention is a continuation in part of our application Serial No. 141,244, filed May 7, 1937.

As is well known, two general methods have heretofore been employed in the manufacture of sodium aluminate. The older of these methods is a dry process wherein aluminous material is calcined with soda ash. A more recent method is a wet process wherein aluminum hydrate is digested with caustic soda to form sodium aluminate solution which is then evaporated to produce the solid product. Both wet and dry processes heretofore employed, however, have been characterized by certain disadvantages, for despite repeated efforts no one has heretofore succeeded in ascertaining and maintaining all the fundamental conditions necessary consistently to produce a product which is completely and rapidly soluble in water, stable in aqueous solutions, and characterized by a minimum content of sodium carbonate or caustic soda.

It has already been proposed, in the prior art, to produce various forms of sodium aluminate; and methods have also been known for treating solutions of sodium aluminate so as to render them stable. However, none of the prior art methods have succeeded in producing a comparatively pure sodium aluminate in which there is but a very slight molar excess of sodium hydroxide while still retaining the free and easy solubility of the product, coupled with substantially permanent stability of the resulting solution.

Thus it has already been proposed to prepare a solution of sodium aluminate in which the molar ratio of sodium oxide to alumina is $Na_2O:Al_2O_3::1.25:1$ and then to take a comparatively strong solution of this product in water and treat it at 100° C. with sugar to the extent of about 1.5% of the weight of the solution, continuing the heating for a period of about 2 hours, it being stated by the previous workers in this field that such treatment will stabilize the resulting solution. It should be noticed in this connection, however, that there is 25% molar excess of sodium oxide in the product, which in itself is thereby rendered less likely to decompose, simply by reason of its great excess of alkalinity. Furthermore, the previous workers in this field found it necessary to heat such solutions for several hours in order to attain the desired stability. In accordance with our present invention, however, we find that such heating is entirely unnecessary; and we are able to produce a finished product in dry form—flaked, granular, or powdered—which will dissolve in cold water and yet produce a solution which is resistant to decomposition and the precipitation or separation of aluminum hydroxide.

It has also been proposed to produce sodium aluminate by digesting aluminum hydroxide in a caustic soda solution, using however a considerable excess of the caustic soda in an attempt to produce a suitable material. Thus, for example, a ratio by weight of one part of alumina, $Al_2O_3$, to one part of sodium hydroxide has been employed in the presence of water to produce a solution of sodium aluminate of sirupy consistency, which was then allowed to solidify into a cake which was then heated to a temperature of from 300° to 450° C., resulting in a product containing about 55% to 60% of soluble alumina and soluble in water to such an extent that it would leave only about 0.1% of insoluble residue. In connection with this prior proposal, however, it was stated that the ratio by weight of alumina to sodium hydroxide was 0.9:1.1 and that if substantially lower ratios were used—that is to say, if there were less alkali than indicated by this weight ratio—the product would be unsatisfactory, unstable and probably insoluble or difficult to dissolve in water except in the presence of an excess of sodium hydroxide.

When calculating the molar ratio of $Na_2O$ to $Al_2O_3$ in the just mentioned prior art product, the following result will be obtained: Let it be assumed that one were to start with 100 grams of aluminum oxide, $Al_2O_3$, having a molecular weight of 102 and 122 grams of sodium hydroxide having a molecular weight of 40, which is a weight ratio of 0.9:1.1 described in this prior art method. However, inasmuch as sodium hydroxide has a molecular weight of only 40, it will at once be apparent that here there are substantially 3.0 mols of sodium hydroxide, NaOH, which is equivalent to 1.50 mols of $Na_2O$. This product therefore has a 50% molar excess of sodium oxide over that required for the theoretical formation of $Na_2Al_2O_4$, which is sodium aluminate. It is stated that such a product is soluble in water, but this is readily accounted for by the fact that it contains this large molar excess of $Na_2O$.

It has also been proposed to produce a sodium aluminate having a molar ratio of $Na_2O$ to $Al_2O_3$ of approximately 1:1 by the expedient of dissolving aluminum hydroxide in an excess of sodium hydroxide, using about 2 mols of $Na_2O$ to one of $Al_2O_3$, and crystallizing from a mother liquor of this composition a sodium aluminate having a 1:1 molar ratio. It is well known, however, that such an aluminate, although soluble in water, almost immediately decomposes therein, with the formation of aluminum hydroxide, by reason of the fact that there is no excess whatever of $Na_2O$; and, while such a composition may be stable in the dry form, it is not stable when dissolved in water.

Attempts have also been made to combine aluminum hydroxide or alumina directly with dry sodium hydroxide in the hope of obtaining a water-soluble sodium aluminate characterized by stability of the resulting solutions, but this has been obtained only by using a considerable excess of sodium hydroxide amounting to from 1.2 to 1.5 mols calculated as $Na_2O$.

Wherein the present invention totally differs from the prior art is in the fact that the composition not only has a low molar ratio of $Na_2O$ to $Al_2O_3$, which does not substantially exceed 1.11:1.0, but also contains up to 5% of what we prefer to call a stabilizing agent and which may consist of any one or a combination of a number of substances such as Rochelle salts, tartaric acid and its salts, saccharates, gluconic acid and its salts, gallic acid and its salts, pyrogallic acid and its salts, sugar, invert sugar, dextrin, starch, glycerols, glycols, phenols or phenolates, and gelatin. The amount of these stabilizing substances will vary, from a fraction of 1% up to 5% on the total weight of the inorganic solids in the composition, and they are preferably so uniformly dispersed throughout the composition that they will dissolve simultaneously with the sodium aluminate when the composition is dissolved in water, which will then form a solution characterized by its stability over long periods of time.

In its preferred embodiment, therefore, our new composition comprises from 95% to 99+% of sodium aluminate, $xNa_2O.Al_2O_3$, in which the ratio of $Na_2O$ to $Al_2O_3$ does not substantially exceed 1.11:1, and also contains up to 5% of the stabilizing material from the above mentioned group of products. In stating this composition, constituent water has been disregarded. Ordinarily the commercial product may contain 20% of water.

An important factor in the manufacture of the composition of the present invention is the definitely controlled conditions under which it is made and, furthermore, the temperature at which it is reduced to the dry state, which should not substantially exceed 350° C. and which preferably is very much lower, namely, not exceeding 200° C. Broadly speaking, the method of manufacture of the composition consists in digesting alumina or aluminum hydroxide in an aqueous solution of sodium hydroxide, using appropriate amounts of these two substances in accordance with the molar ratios herein mentioned and heating the mixture until the aluminum hydroxide has gone completely and entirely into a clear solution, whereafter the said solution is dried under conditions of high surface exposure so as to reduce it as rapidly as possible to a dry condition, which can be most conveniently done on a suitable rotary drum drier, from the periphery of which the product can be removed in dry form by means of a doctor blade or similar device. The stabilizing agent may be added in one of two ways: It may be mixed very thoroughly with the dry product obtained from the drum drier or, and this method is more advantageous, it may be added to the solution of the alumina in the sodium hydroxide solution, in which case there will be assured a uniform distribution of the stabilizing agent throughout every particle of our product.

As an exemplification of a commercial and practical method of manufacturing our new product, we submit the following, without however in any way wishing to limit the invention to the precise quantities expressed, provided only that the molar ratios be retained: 7112 pounds of sodium hydroxide solution containing 48% of actual NaOH are heated in a steam-jacketed kettle to a temperature of approximately 120° C. To this hot sodium hydroxide solution there are gradually added—for instance, being fed in by a screw conveyor—6279 pounds of aluminum hydrate containing 62.25% of $Al_2O_3$. The addition of the aluminum hydrate being rather gradual, it will require from 45 minutes to one hour to get it all into the sodium hydroxide solution. The resulting mixture is then gently boiled at a temperature of approximately 120° C. until every bit of the aluminum hydroxide is dissolved and a clear sirupy solution is obtained. At this point is added the stabilizing agent, which may be any one of the substances above enumerated and which bears a ratio of up to 5% of the weight of the inorganic constituents of the solution. In the case of Rochelle salts, we have found that 85 pounds thereof is a satisfactory amount. The heating or digestion is thereupon continued until complete solution of the added stabilizing agent—in this case the Rochelle salts—is obtained. Mechanical agitation is, of course, provided in order to blend the material and to assist in the solution thereof in the sodium hydroxide solution. When the solution has become clear, it is fed into a drum drier, preferably of the double-drum weir feed type, the weir feed boxes of which are steam jacketed so that, as the sirupy solution is fed to the weir boxes, some further evaporation and concentration of the solution is effected. The liquor, when picked up by the drums as they revolve past the weir feeds, is very heavy and viscous. These drums are driven at a speed of about ½ to ⅔ revolution per minute and are kept at a temperature of from 150° to 160° C. The temperature may be higher than this, but we have found it very disadvantageous to raise it higher than 350° C. and greatly prefer to operate at a temperature which is definitely below 200° C. and preferably is from 150° to 160° C., although somewhat lower temperatures can be used. As a result of the heat input from the surfaces of the drying drums, the excess water in the composition is evaporated, so that the dry product may be scraped from the drums by a doctor blade or knife edge, coming off in the form of rather large flakes. The dry product is then conveyed to a crusher, where the flakes are broken down into smaller units, this constituting the finished product which is ready for packaging and shipping. From the batch described above, there is usually obtained about 8500 pounds of finished product.

If the above materials are calculated to molar ratios, it will be found that the product will have a ratio of sodium oxide to aluminum oxide of about 1.11:1, and we have found it quite important to maintain this ratio closely within these limits. If we use too much sodium hydroxide—that is, if the ratio becomes greater than that mentioned, we then get into our product an undesirable excess alkalinity; and if we use less than that amount, we do not attain quite the degree of solubility which we desire in the material. When using some of the other enumerated stabilizing agents, such as sugar, gluconic acid, glycerol, etc., they may likewise be added to the clear solution prior to application thereof to the drum drier. In the case of perfectly dry materials, however, such as Rochelle salts, gluconic acid, gallic and pyrogallic acids, these may be added to the product which is removed from the drums, preferably after grinding, taking great care thoroughly to disseminate the material as uniformly as possible throughout the mixture. It will be readily seen, however, that its introduction into the solution will give much more uniform distribution and is therefore the preferred embodiment of our invention.

In order to demonstrate the correctness of our method of operation as well as our theory, we have prepared sodium aluminate having the same molar ratio of 1.11:1 but without the presence of any stabilizing agent and have compared this with the product of our invention. Thus, when 10 grams of the product which does not contain the stabilizing agent are dissolved in, for example, 90 grams of distilled water, hydrolysis and subsequent precipitation of aluminum hydroxide will take place almost immediately. We have never been able to obtain, without the use of a stabilizing agent, a solution which remains stable over 4 hours, and in most cases hydrolysis and precipitation begin in less than 30 minutes. We do not consider a product which does not remain in solution for at least 4 hours as being stable within the sense of the term in which we use it.

The material of our present invention, however, when dissolved in the same proportions—that is, 10 grams per 90 grams of distilled water, will remain stable for over two weeks; and a solution of that kind is what we mean by a stable solution. When it is considered that sodium aluminate is now being employed on a large scale in the manufacture of paper, particularly when affixing or precipitating starch onto paper fibers during the formation of a paper sheet, in which case it is necessary to prepare large quantities of a very pure sodium aluminate solution which is fed to the head box of the paper-making machine under careful hydrogen-ion control, it will be seen that it is extremely important to be able to furnish to the paper manufacturer a sodium aluminate of standardized and known properties from which he can prepare, by mere solution in cold water, a stable, clear, uniform and satisfactory solution of sodium aluminate. The prior art products contained entirely too much sodium hydroxide to permit of their use in these rather delicate processes. For example, in a process of this type where aluminum sulfate is added to a dilute suspension of paper fibers together with dissolved starch, and the starch is then precipitated by the addition of sodium aluminate to the fiber-starch aluminum-sulfate mixture, aluminum hydroxide will be formed from both the aluminum sulfate and the sodium aluminate, the only other by-product being sodium sulfate, which is harmless in the paper. However, if the sodium aluminate employed contains an unnecessarily large excess of sodium hydroxide, it will be seen that some of the aluminum sulfate will have been precipitated by the sodium hydroxide to form aluminum hydroxide. It might appear to be a matter of indifference whether the aluminum hydroxide floc were formed from aluminum sulfate or sodium hydroxide, or from both the aluminum sulfate and the sodium aluminate. It has been found, however, that the physical characteristics of the floc resulting from the precipitation of aluminum sulfate by sodium hydroxide is by no means as satisfactory as that produced by the interaction between our product and aluminum sulfate.

A further advantage of our process lies in the fact that by the proper choice of apparatus we can produce a material which is almost entirely free from iron and which therefore will not discolor the paper in which it is employed.

In the foregoing detailed description of the invention it is apparent that many variations may be made without departing from the spirit and scope thereof. Thus, for example, the rotary atmospheric drum drier described in the foregoing specific example may be substituted by a drum drier of the vacuum type, if desired, or by any other type of evaporating equipment wherein the solution may be heated to the desired and controlled temperature in a condition of high surface exposure. For example, the solution may be spread in the form of a film on a directly heated, flat metallic surface or an endless, flexible metal belt maintained at the proper temperature, or the material may be poured into large, shallow pans and dried in a tunnel drier. Any method of drying is satisfactory which will permit the convenient maintenance of controlled temperatures up to 350° C. This method of drying avoids the formation of the water-insoluble content present in the sodium aluminate previously available in the art, since this insoluble material is due, to a great extent, to the calcining of the material at a temperature in excess of 350° C.

Our material contains approximately 20% of water, although it is a dry product, and has an apparent density of approximately 66 pounds per cubic foot. It is so soluble that about 90 grams thereof will dissolve in 100 grams of water to produce a solution containing 47% of solids without the precipitation of any aluminum hydroxide. This is a degree of solubility never before obtained in the art of manufacturing a sodium aluminate having a very low ratio of sodium oxide to aluminum oxide and presents a very decided advance over anything that has been done along this line heretofore.

We again wish to emphasize that we wish to disclaim the preparation of solutions of sodium aluminate stabilized by the addition of stabilizing agents and which are shipped or sold as solutions; and we disclaim any sodium aluminate containing a $Na_2O:Al_2O_3$ molar ratio substantially above 1.11:1, for such sodium aluminates are fairly stable but are entirely too alkaline to be universally applicable. Our product contains the lowest feasible amount of $Na_2O$ to $Al_2O_3$ coupled with solubility as well as real stability of the resulting solution.

We claim:

1. A process of producing a composition of matter consisting mainly of sodium aluminate and up to 5% of an organic stabilizing agent, which comprises dissolving aluminum hydrate in strong aqueous sodium hydroxide at a temperature not substantially exceeding 120° C. until a clear solution is obtained, whereby to obtain a water-soluble compound of sodium oxide and aluminum oxide having a slight molar excess of $Na_2O$ to $Al_2O_3$ in the ratio of approximately 11:10 adding up to 5% of an organic stabilizing agent to said solution, and drying the resulting solution under conditions of high surface exposure in the form of a thin film maintained at a temperature not substantially exceeding 200° C.

2. A process of producing a composition of matter consisting mainly of sodium aluminate and up to 5% of an organic stabilizing agent, which comprises dissolving aluminum hydrate in strong aqueous sodium hydroxide at a temperature not substantially exceeding 120° C. until a clear solution is obtained whereby to obtain a water-soluble compound of sodium oxide and aluminum oxide having a slight molar excess of $Na_2O$ to $Al_2O_3$ in the ratio of approximately 11:10; adding to said solution up to 5% of an organic stabilizing agent selected from the group of polyhydroxy organic compounds consisting of tartaric acid and its salts, gluconic acid and its salts, gallic acid and its salts, pyrogallic acid and its salts, and invert sugar; drying the resulting solution under conditions of high surface exposure in the form of a thin film maintained at a temperature not substantially exceeding 200° C.; and comminuting the resulting dry product.

3. A process of manufacturing dry, completely and rapidly water-soluble composition containing sodium aluminate, which comprises digesting aluminum hydrate in an aqueous solution of sodium hydroxide until all of the aluminum hydrate is dissolved and a clear syrupy solution is obtained whereby to obtain a water-soluble compound of sodium oxide and aluminum oxide having a slight molar excess of $Na_2O$ to $Al_2O_3$ in the ratio of approximately 11:10, thereafter evaporating water from the solution by heating the same in a condition of high surface exposure in the form of a thin film maintained at a temperature below about 200° C., and incorporating with the sodium aluminate an organic stabilizing agent selected from the group of polyhydroxy organic compounds consisting of tartaric acid and its salts, gluconic acid and its salts, gallic acid and its salts, pyrogallic acid and its salts, and invert sugar.

4. The process of claim 3 wherein the evaporation is carried out at a temperature above 150° C. but below about 200° C.

5. The process of claim 3 wherein said digestion is carried out at a temperature not substantially exceeding 120° C. and said evaporation is carried out at a temperature of from about 150° C. to below about 200° C.

6. A process of manufacturing a dry, completely and rapidly water-soluble composition containing sodium aluminate, which comprises adding aluminum hydrate in gradual increments to a hot aqueous solution of caustic soda until a sufficient quantity of aluminum hydrate has been added whereby to obtain a water-soluble compound of sodium oxide and aluminum oxide having a slight molar excess of $Na_2O$ to $Al_2O_3$ in the ratio of approximately 11:10, heating the reaction mixture until all the aluminum hydrate is dissolved and a clear syrupy solution is formed, the temperature of the heating not substantially exceeding 120° C.; spreading the solution in the form of a thin film on a surface maintained at a temperature sufficient to heat said film to above about 150° C. and below about 200° C. to produce thereby a thin dry film of solid material containing sodium aluminate; and incorporating with the sodium aluminate, at any convenient step in said process, up to 5% by weight of an organic stabilizing agent selected form the group of polyhydroxy organic compounds consisting of tartaric acid and its salts, gluconic acid and its salts, gallic acid and its salts, pyrogallic acid and its salts, and invert sugar.

7. A process of manufacturing a dry, completely and rapidly water-soluble composition containing sodium aluminate, which comprises adding aluminum hydrate in substantially stoichiometric quantities and in gradual increments to a hot aqueous solution of caustic soda and digesting said solution until a clear syrupy solution is obtained, whereby to obtain a water-soluble compound of sodium oxide and aluminum oxide having a slight molar excess of $Na_2O$ to $Al_2O_3$ in the ratio of approximately 11:10, thereafter spreading the solution in the form of a thin film on a surface maintained at a temperature sufficient to heat said film to above about 150° C. but below about 200° C., and incorporating with said aluminate, at any convenient step in said process, a small quantity of an organic stablizing agent consisting of Rochelle salts.

8. As a new composition of matter, a rapidly water-soluble compound of sodium oxide and aluminum oxide containing a slight molar excess of $Na_2O$ with respect to $Al_2O_3$ in a ratio of approximately 11:10, in admixture with up to 5% of an organic stabilizing agent adapted to prevent the separation of aluminum hydroxide from an aqueous solution of said compound, said composition being a dry product easily and completely soluble in water to form therewith a substantially clear solution characterized by stability over long periods of time.

9. The composition of claim 8 wherein said organic stabilizing agent is selected from the group of polyhydroxy organic compounds consisting of tartaric acid and its salts, gluconic acid and its salts, gallic acid and its salts, pyrogallic acid and its salts, and invert sugar.

10. As a new composition of matter a rapidly water-soluble compound of sodium oxide and aluminum oxide containing a slight molar excess of $Na_2O$ with respect to $Al_2O_3$ in a ratio not exceeding approximately 11:10, in admixture with up to 5% of Rochelle salts effective to prevent the separation of aluminum hydroxide from an aqueous solution of said compound, said composition being a dry product, easily soluble in water to form therewith a substantially clear solution characterized by stability over long periods of time.

11. As a new composition of matter a rapidly water-soluble compound of sodium oxide and aluminum oxide containing a slight molar excess of $Na_2O$ with respect to $Al_2O_3$ in a ratio not exceeding approximately 11:10, in admixture with up to 5% of invert sugar effective to prevent the separation of aluminum hydroxide from an aqueous solution of said compound, said composition being a dry product, easily soluble in water to form therewith a substantially clear solution characterized by stability over long periods of time.

12. A process of manufacturing a dry, completely and rapidly water-soluble composition containing sodium aluminate characterized by stability over long periods of time when dissolved in water, despite its low alkalinity, which process comprises adding aluminum hydrate in substantially stoichiometric quantities and in gradual increments to a hot aqueous solution of caustic soda and digesting said solution until a clear syrupy solution is obtained, whereby to obtain a water-soluble compound of sodium oxide and aluminum oxide having a slight molar excess of $Na_2O$ to $Al_2O_3$ in the ratio of approximately 11:10, thereafter spreading the solution in the form of a thin film on a surface maintained at a temperature sufficient to heat said film to about 150° C. but below about 200° C.; and incorporating with said aluminate, at any convenient step, a small quantity of an organic stabilizing agent selected from the group of polyhydroxy organic compounds consisting of tartaric acid and its salts, gluconic acid and its salts, gallic acid and its salts, pyrogallic acid and its salts, and invert sugar.

FREDERICK K. LINDSAY.
BENJAMIN F. WILLEY.